(12) United States Patent
Arahira (10) Patent No.: US 9,294,271 B2
(45) Date of Patent: Mar. 22, 2016

(54) QUANTUM-KEY-DISTRIBUTION RECEIVING DEVICE AND METHOD FOR USING SINGLE-PHOTON DETECTOR

(71) Applicant: Oki Electric Industry Co., Ltd., Tokyo (JP)

(72) Inventor: Shin Arahira, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 14/309,150

(22) Filed: Jun. 19, 2014

(65) Prior Publication Data

US 2015/0036819 A1  Feb. 5, 2015

(30) Foreign Application Priority Data

Jul. 31, 2013  (JP) .................................. 2013-159587

(51) Int. Cl.
*H04L 9/08* (2006.01)
(52) U.S. Cl.
CPC .................................... *H04L 9/0858* (2013.01)
(58) Field of Classification Search
None
See application file for complete search history.

(56) References Cited

U.S. PATENT DOCUMENTS

| 2004/0109564 A1* | 6/2004 | Cerf et al. | 380/256 |
|---|---|---|---|
| 2007/0065155 A1* | 3/2007 | Luo et al. | 398/141 |
| 2007/0076871 A1* | 4/2007 | Renes | 380/201 |
| 2009/0039237 A1* | 2/2009 | Inoue et al. | 250/214 R |
| 2010/0034390 A1* | 2/2010 | Yamamoto et al. | 380/278 |
| 2011/0173696 A1* | 7/2011 | Dynes et al. | 726/22 |
| 2013/0301333 A1* | 11/2013 | Gilbert et al. | 365/106 |

OTHER PUBLICATIONS

Benjamin Miquel et al., "Observation of 1.5µm band entanglement using single photon detectors based on sinusoidally gated InGaAs/InP avalanche photodiodes" New Journal of Physics 11, Apr. 30, 2009.
D Stucki et al., "Quantum key distribution over 67 km with a plug & play system" New Journal of Physics, vol. 4, No. 1, Jul. 12, 2002.
Shin Arahira et al., "Experimental investigation in transmission performance of polarization-entangled photon-pairs generated by cascaded $\chi^{(2)}$ processes over standard single-mode optical fibers" Optics Express, vol. 20, No. 14, Jun. 22, 2012.
Andrew J. Metcalf et al., "High-Power Broadly Tunable Electro-Optic Frequency Comb Generator" Journal of Selected Topics in Quantum Electronics, Dec. 2013.

* cited by examiner

*Primary Examiner* — Hadi Armouche
*Assistant Examiner* — Malcolm Cribbs
(74) *Attorney, Agent, or Firm* — Rabin & Berdo, P.C.

(57) ABSTRACT

There is provided a quantum-key-distribution receiving device used in a quantum key distribution system that utilizes a pair of quantum-entangled photons including a signal photon and an idler photon, the quantum-key-distribution receiving device including a single-photon detector in which a secure-key generation rate is dependent on a first performance index $\eta/(1+P_a)$, $\eta$ denoting a detection efficiency and $P_a$ denoting an after-pulse probability.

1 Claim, 6 Drawing Sheets

QUANTUM-KEY-DISTRIBUTION RECEIVING DEVICE AND METHOD FOR USING SINGLE-PHOTON DETECTOR

CROSS REFERENCE TO RELATED APPLICATION(S)

This application is based upon and claims benefit of priority from Japanese Patent Application No. 2013-159587, filed on Jul. 31, 2013, the entire contents of which are incorporated herein by reference.

BACKGROUND

The present invention relates to quantum-key-distribution receiving devices used in quantum key distribution systems that utilize pairs of quantum-entangled photons, and to methods for using single-photon detectors included in such quantum-key-distribution receiving devices.

In order to realize secure encrypted communication without information leakage, it is essential that keys used for encrypting and decrypting the information are shared only by a transmitter and a receiver and are not known to a third person, such as an eavesdropper.

A quantum key distribution system is attracting attention as an encryption key distribution system that guarantees ultimate unconditional security according to a physical law, and has been actively researched and developed in recent years for application to a high-security information communication system in the future.

One type of quantum key distribution system is a single-photon type that utilizes a single photon or a pseudo single photon, such as a weak laser beam. In the following description, a single photon or a pseudo single photon may also be simply referred to as "photon".

Figure 9:
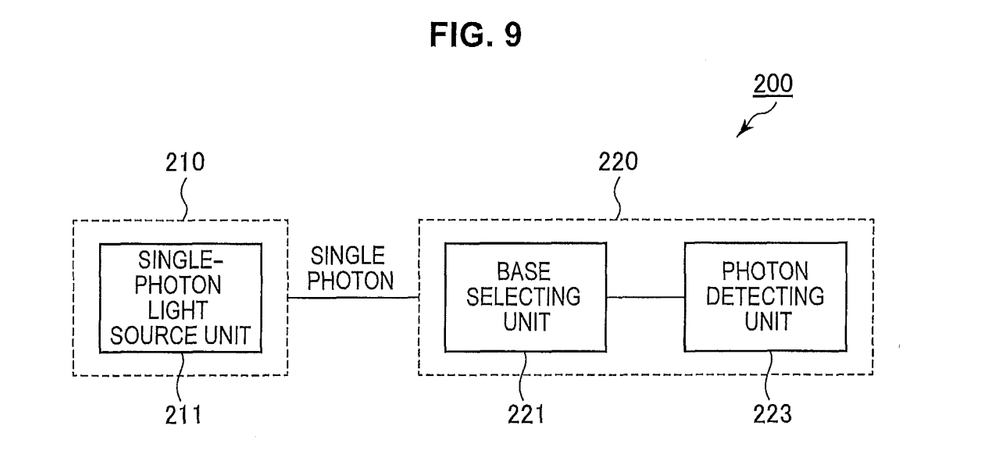
FIG. 9 schematically illustrates a single-photon-type quantum key distribution system.

A single-photon-type quantum key distribution system will be described with reference to FIG. 9. FIG. 9 schematically illustrates a single-photon-type quantum key distribution system.

A single-photon-type quantum key distribution system 200 includes a quantum-key-distribution transmitting device (which may also be simply referred to as "transmitting device" hereinafter) 210 and a quantum-key-distribution receiving device (which may also be simply referred to as "receiving device" hereinafter) 220.

The transmitting device 210 has a single-photon light source unit 211 that generates a photon. The receiving device 220 has a base selecting unit 221 and a photon detecting unit 223 that includes multiple single-photon detectors.

In view of achieving loss reduction in long-distance transmission as well as achieving cost reduction by utilizing an existing optical-fiber communication network, the transmitting device 210 and the receiving device 220 are preferably connected to each other by, for example, an optical fiber. A photon waveband to be used in quantum key distribution is preferably a 1.3-µm waveband or a 1.5-µm waveband, as in normal optical-fiber communication.

In the quantum key distribution system 200 that utilizes the polarization state of a photon, the single-photon light source unit 211 in the transmitting device 210 generates a photon by randomly selecting the polarization state thereof from, for example, a vertically (V) polarized state, a horizontally (H) polarized state, a diagonally polarized state at 45 degrees to the right, and a diagonally polarized state at 45 degrees to the left. The generated photon is transmitted to the receiving device 220. A case where a vertically-polarized photon or a horizontally-polarized photon is selected and transmitted will be referred to as "H/V transmission base", whereas a case where a 45-degree-diagonally-right-polarized photon or a 45-degree-diagonally-left-polarized photon is selected and transmitted will be referred to as "diagonal transmission base".

The base selecting unit 221 in the receiving device 220 randomly selects a reception base, to be used for measuring the incoming photon, from an H/V reception base and a diagonal reception base. Then, the photon detecting unit 223 receives the photon by using the single-photon detectors in accordance with the selection made by the base selecting unit 221 and measures the polarization state of the photon. If the H/V reception base is selected, a measurement process for determining whether the photon is vertically polarized or horizontally polarized is performed. If the diagonal reception base is selected, a measurement process for determining whether the photon is diagonally polarized at 45 degrees to the right or diagonally polarized at 45 degrees to the left is performed. This measurement system including the base selecting unit 221 and the photon detecting unit 223 may be realized with, for example, an optical system that uses a polarization beam splitter and a wave plate.

The H/V transmission base and the diagonal transmission base are non-orthogonal to each other. Therefore, by measuring a vertically-polarized or horizontally-polarized photon based on the H/V reception base, a definitive measurement result is obtained with respect to whether the photon is vertically polarized or horizontally polarized. However, if a vertically-polarized or horizontally-polarized photon is measured based on the diagonal reception base, a definitive result cannot be obtained since the determination of whether the photon is vertically polarized or horizontally polarized can only be made with a probability of 50%.

For example, if the transmitter transmits a photon based on the H/V transmission base and the receiver selects the H/V reception base and performs a measurement process, the receiver is able to definitively know the polarization state of the photon transmitted by the transmitter. In this case, for example, by setting the vertically-polarized state to "1" and the horizontally-polarized state to "0", a random bit string can be shared between the transmitter and the receiver.

If the transmitter transmits a photon based on the H/V transmission base and the receiver selects the diagonal reception base and performs a measurement process, the receiver is only able to stochastically know the polarization state of the photon transmitted by the transmitter. In this case, a random bit string cannot be shared between the transmitter and the receiver.

By using this mechanism, the transmitter and the receiver may inform each other of the selected bases after obtaining a measurement result for the required bit number, and may use only a bit value corresponding to when the bases match, whereby the transmitter and the receiver can share the same random bit string. By utilizing this shared bit string in quantum key distribution as an encryption key, secure encrypted communication can be performed.

In order to prevent eavesdropping on encryption keys, it is necessary to use one photon or less for each bit. Therefore, in order to realize a quantum key distribution system using a photon, each of the single-photon detectors included in the photon detecting unit 223 needs to be able to detect a photon at a single-photon level. For example, a semiconductor avalanche photodiode or a superconductor detector has been reported as a single-photon detector of this type. In particular, an InGaAs/InP avalanche photodiode is widely used as a low-cost single-photon detector that operates in the aforementioned optical-fiber communication waveband. However, due to having a high dark-current detection rate and a high after-pulse generation rate (which will also be referred to as "after-pulse probability" hereinafter), an InGaAs/InP avalanche photodiode is generally used by making it perform so-called gate operation in which a photon is received by applying a voltage that exceeds an avalanche critical voltage only when necessary.

System performance of the quantum key distribution system is evaluated mainly based on two points, which are a transmittable distance and a secure encryption key (also referred to as "secure key") generation rate.

A transmittable distance is dependent on, for example, a propagation loss in a transmission path as well as the detection efficiency and the dark-current detection rate of a single-photon detector. A single-photon-detector performance index related to a transmittable distance can be expressed by η/d, where η denotes a detection efficiency and d denotes a dark-current detection rate.

An encryption-key generation rate is dependent on a photon detection rate and an error rate of a single-photon detector.

A photon detection rate per unit time can be expressed by αημf, where α denotes a total loss, such as a propagation loss in a transmission path and an excessive loss occurring at the single-photon light source unit 211, etc., and μf denotes the number of photons transmitted per unit time from the single-photon light source unit 211. In the case of a gate-operating single-photon detector, it can be considered that f denotes a gate frequency and μ denotes an average number of photons per gate.

An error rate may increase due to multiple factors, such as a problem in the adjustment of the optical system. Factors deriving from the photon detecting unit 223 include a dark current or an after-pulse in a single-photon detector. An error rate e deriving from the photon detecting unit 223 in the single-photon-type quantum key distribution system is expressed by expression (1) below (e.g., see "D. Stucki et al "Quantum key distribution over 67 km with a plug&play system", New Journal of Physics 4(2002) 41" (Non-Patent Literature 1)). $P_a$ denotes an after-pulse probability.

$$e = \frac{d}{\mu\eta\alpha} + P_a \qquad (1)$$

An increase in the error rate e leads to a decrease in the amount of information about the ultimate secure key, which is not known to an eavesdropper and is obtained after a key distillation process, such as an error correction process and a concealment amplification process. When performing a general key distillation process, the amount of information H(e) after the key distillation process can be expressed by, for example, expression (2) below (e.g., see "Benjamin Miguel and Hiroki Takesue "Observation of 1.5 μm band entanglement using single photon detectors based on sinusoidally gates InGaAs/InP avalanche photodiodes" New Journal of Physics 11 (2009) 045006 (15pp)" (Non-Patent Literature 2)). In the following expression, f(e) denotes an error correcting capability.

$$H(e)=1-\log_2(1+4e-4e^2)+f(e)\{e\log_2 e+(1-e)\log_2(1-e)\} \qquad (2)$$

In order for the transmitter and the receiver to securely share an encryption key, H(e)>0 needs to be satisfied. The error correcting capability f(e) is 1 at the Shannon limit. Therefore, in order to achieve H(e)>0 when f(e)=1, the error rate needs to satisfy e<11.4%.

As shown in expression (3) below, a generation rate $f_{secure}$ of an ultimately-obtained secure key is a value obtained by multiplying the amount of information H(e) after the key distillation process by a sift-key generation rate $R_{sift}$ per gate and the gate frequency f.

$$f_{secure}=R_{sift}fH(e) \qquad (3)$$

Based on expression (3), the secure-key generation rate $f_{secure}$ can be increased by increasing the sift-key generation rate $R_{sift}$, the amount of information H(e) after the key distillation process, or the gate frequency f.

SUMMARY

The sift-key generation rate $R_{sift}$ includes the average number μ of photon-pairs per gate and the detection efficiency η of a single-photon detector as parameters. Therefore, by increasing the average number μ of photon-pairs or the detection efficiency η, the sift-key generation rate $R_{sift}$ can be increased.

However, when the average number μ of photon-pairs increases, the probability at which one bit includes multiple photons increases, thus leading to an increased risk of eavesdropping. Thus, the average number μ of photon-pairs is generally set to about 0.1, and it is difficult to significantly increase this value.

Furthermore, when the detection efficiency η is increased, the dark-current detection rate d and the after-pulse probability $P_a$ increase. Moreover, when the gate frequency f is increased, the after-pulse probability $P_a$ increases. In the single-photon-type quantum key distribution system, an increase in the dark-current detection rate d and an increase in the after-pulse probability $P_a$ based on expression (1) above lead to an increase in the error rate e. Therefore, when the detection efficiency η and the gate frequency f are increased, the error rate e increases.

As already described above, in order for the transmitter and the receiver to share an encryption key, the error rate needs to satisfy e<11.4%. Therefore, the after-pulse probability needs to be reduced so that $P_a$<11.4% is satisfied based on expression (1) above. In actual operation, $P_a$ is generally reduced to about 4% to 5% at maximum so as to achieve a significant secure-key generation rate.

Therefore, in the single-photon-type quantum key distribution system, there are limitations to the gate frequency f and the detection efficiency η of a single-photon detector for reducing the after-pulse probability $P_a$. As a result, there is a problem in that an increase in the secure-key generation rate $f_{secure}$ is limited. In particular, in a case where an InGaAs/InP avalanche photodiode is used as a single-photon detector, the occurrence of an after-pulse is prominent. Thus, in order to reduce the after-pulse probability $P_a$, the detection efficiency η and the gate frequency f are significantly limited.

Furthermore, an after-pulse results greatly from incompleteness of a crystal constituting a photon detecting element in a single-photon detector. Therefore, the after-pulse probability $P_a$ varies from single-photon detector to single-photon detector. Consequently, the detection efficiency η for reducing the after-pulse probability $P_a$ varies from single-photon detector to single-photon detector, thus also causing the secure-key generation rate $f_{secure}$ to vary. Depending on the after-pulse probability $P_a$ of each single-photon detector used, the secure-key generation rate $f_{secure}$ may significantly decrease.

It is desirable to provide a quantum-key-distribution receiving device equipped with a single-photon detector in which a satisfactory secure-key generation rate can be obtained over a wide range of after-pulse probabilities without the secure-key generation rate being restricted by an after-pulse probability.

The present inventor has come to realize that, in a quantum-entanglement-based quantum key distribution system, the error rate does not increase even when the after-pulse probability of the single-photon detector increases, and the secure-key generation rate is defined by including a parameter $\eta/(1+P_a)$. Thus, it has been discovered that, when setting a drive parameter of the single-photon detector in the quantum-entanglement-based quantum key distribution system, a performance index $\eta/(1+P_a)$ is appropriately set so that a satisfactory secure-key generation rate can be obtained without being restricted by the after-pulse probability.

In view of the above, a quantum-key-distribution receiving device according to the present invention is provided with the following configuration.

Specifically, according to an aspect of the present invention, there is provided a quantum-key-distribution receiving device used in a quantum key distribution system that utilizes a pair of quantum-entangled photons including a signal photon and an idler photon. The quantum-key-distribution receiving device includes a single-photon detector in which a secure-key generation rate is dependent on a performance index $\eta/(1+P_a)$, $\eta$ denoting a detection efficiency and $P_a$ denoting an after-pulse probability.

In the quantum-key-distribution receiving device according to the present invention, the performance index $\eta/(1+P_a)$ is set to a large value (e.g., maximum value) in accordance with the after-pulse probability of the single-photon detector so that a satisfactory secure-key generation rate can be obtained. Thus, the secure-key generation rate can be increased without being restricted by the after-pulse probability. Accordingly, a satisfactory secure-key generation rate can be obtained over a wide range of after-pulse probabilities.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Polarization-Entanglement-Based Quantum Key Distribution System

Figure 1:
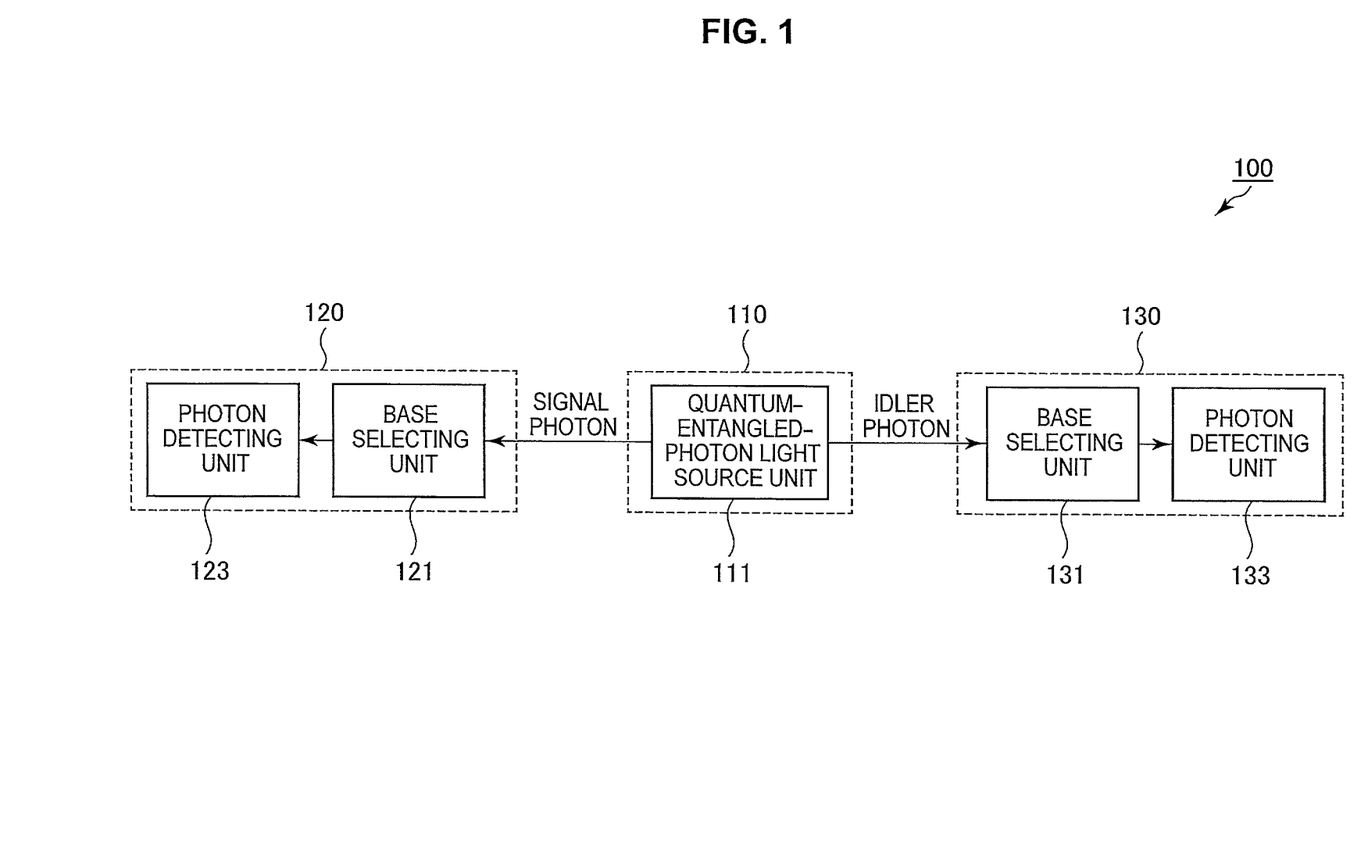
FIG. 1 schematically illustrates a quantum-entanglement-based quantum key distribution system.

A receiving device according to the present invention is used in a quantum-entanglement-based quantum key distribution system. First, the configuration of a quantum-entanglement-based quantum key distribution system will be described with reference to FIG. 1. FIG. 1 schematically illustrates the quantum-entanglement-based quantum key distribution system. A method of utilizing a pair of polarization-entangled photons will mainly be described as a quantum-entanglement method.

A quantum-entanglement-based quantum key distribution system 100 includes a transmitting device 110 and two receiving devices 120 and 130. For example, optical fibers are preferably used for connecting between the transmitting device 110 and the receiving device 120 as well as between the transmitting device 110 and the receiving device 130.

The transmitting device 110 has a quantum-entangled-photon light source unit 111. The quantum-entangled-photon light source unit 111 generates a pair of polarization-entangled photons constituted of a signal photon and an idler photon. A pair of polarization-entangled photons is a pair of photons in which the polarization state of each photon is not determined, whereas the relationship between the pair of photons is determined. Therefore, pairs of polarization-entangled photons are in a state where combinations of multiple polarization states existing in the pairs of photons are superposed, and are pairs of correlated photons having a polarization correlation between the pairs of photons. A pair of polarization-entangled photons may also be simply referred to as "a pair of photons" hereinafter.

Of the pair of generated photons, one photon is transmitted to the receiving device 120, whereas the other photon is transmitted to the receiving device 130. FIG. 1 illustrates a configuration example in which the signal photon is transmitted to the receiving device 120 and the idler photon is transmitted to the receiving device 130.

The receiving device 120 has a base selecting unit 121 and a photon detecting unit 123 that includes multiple single-photon detectors. Likewise, the receiving device 130 has a base selecting unit 131 and a photon detecting unit 133 that includes multiple single-photon detectors.

The base selecting units 121 and 131 in the respective receiving devices 120 and 130 randomly select a reception base, to be used for measuring incoming photons, from an H/V reception base and a diagonal reception base. Then, the photon detecting units 123 and 133 receive the photons by using the single-photon detectors in accordance with the selections made by the base selecting units 121 and 131 and measure the polarization state of the photons. If the H/V reception base is selected, a measurement process for determining whether a photon is vertically polarized or horizontally polarized is performed. If the diagonal reception base is selected, a measurement process for determining whether a photon is diagonally polarized at 45 degrees to the right or diagonally polarized at 45 degrees to the left is performed.

The H/V reception base and the diagonal reception base are non-orthogonal to each other. Therefore, by measuring a vertically-polarized or horizontally-polarized photon based on the H/V reception base, a definitive measurement result is obtained with respect to whether the photon is vertically polarized or horizontally polarized. However, if a vertically-polarized or horizontally-polarized photon is measured based on the diagonal reception base, a definitive result cannot be obtained since the determination of whether the photon is vertically polarized or horizontally polarized can only be made with a probability of 50%.

If the receiving device 120 and the receiving device 130 select the same reception base in accordance with a quantum-entanglement principle, the polarization state of the respective photons can be definitively determined. On the other hand, if different reception bases are selected, the polarization state of the respective photons can only be determined stochastically. For example, in a case where the receiving devices 120 and 130 perform the measurement by selecting the H/V reception base and the diagonal reception base, respectively, the polarization state of the respective photons can only be determined stochastically.

In the quantum key distribution system 100 having this configuration, for example, a vertically-polarized photon and a 45-degree-diagonally-right-polarized photon are each given a bit value of "1", whereas a horizontally-polarized photon and a 45-degree-diagonally-left-polarized photon are each given a bit value of "0". Then, after a receiver having the receiving device 120 and a receiver having the receiving device 130 obtain measurement results for a required bit number, the two receivers inform each other of their selected reception bases and extract bits if the reception bases match. Furthermore, of the extracted bits, bits with matching bit values are extracted so that a bit string is generated. By using this bit string, the receiver having the receiving device 120 and the receiver having the receiving device 130 can share the same random bit string. Then, this bit string can be used as an encryption key.

As already described above, in order to prevent eavesdropping on encryption keys, it is necessary to use one photon or less for each bit. Therefore, in order to realize a quantum key distribution system using photons, a single-photon detector that can detect a photon at a single-photon level is required. As a quantum-key-distribution receiving device that uses such a single-photon detector, a so-called passive modulation type and a so-called active modulation type are known. These types of receiving devices will be described below.

Passive Modulation Type

Figure 2:
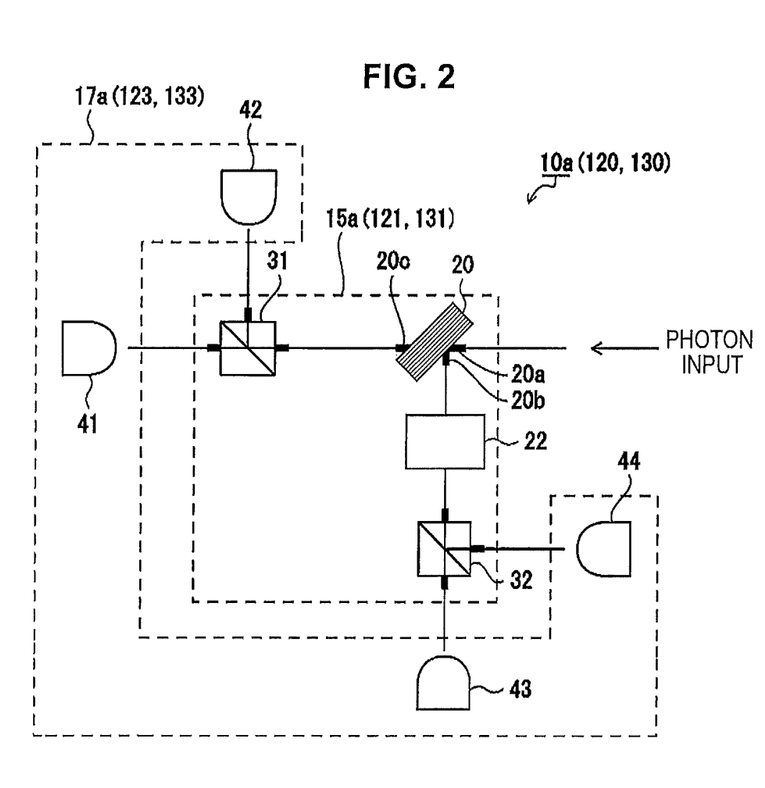
FIG. 2 schematically illustrates a passive-modulation-type receiving device.

A passive-modulation-type receiving device will be described with reference to FIG. 2. FIG. 2 schematically illustrates a passive-modulation-type receiving device. A receiving device 10a shown in FIG. 2 corresponds to the receiving devices 120 and 130 shown in FIG. 1. Furthermore, a base selecting unit 15a shown in FIG. 2 corresponds to the base selecting units 121 and 131 shown in FIG. 1. Moreover, a photon detecting unit 17a shown in FIG. 2 corresponds to the photon detecting units 123 and 133 shown in FIG. 1.

In the passive-modulation-type receiving device 10a, the base selecting unit 15a has a half mirror 20, a polarization converter 22, a first polarization beam splitter 31, and a second polarization beam splitter 32. The photon detecting unit 17a has four single-photon detectors 41, 42, 43, and 44.

In the passive-modulation-type receiving device 10a, a photon is first input to the half mirror 20. Since there is basically one incoming photon, the photon input to a first input-output terminal 20a of the half mirror 20 is output only to one of a second input-output terminal 20b and a third input-output terminal 20c.

The photon output from the third input-output terminal 20c of the half mirror 20 is sent to the first polarization beam splitter 31. A case where this photon reaches the first polarization beam splitter 31 corresponds to that the H/V reception base is selected. The first polarization beam splitter 31 sends a vertically-polarized photon to the first single-photon detector 41 and sends a horizontally-polarized photon to the second single-photon detector 42.

On the other hand, the photon output from the second input-output terminal 20b of the half mirror 20 is sent to the second polarization beam splitter 32 via the polarization converter 22. The polarization converter 22 converts a 45-degree-diagonally-right-polarized photon and a 45-degree-diagonally-left-polarized photon into a vertically-polarized photon or a horizontally-polarized photon. A case where the photon reaches the second polarization beam splitter 32 corresponds to that the diagonal reception base is selected. The second polarization beam splitter 32 sends the vertically-polarized photon to the third single-photon detector 43 and sends the horizontally-polarized photon to the fourth single-photon detector 44.

With regard to this passive-modulation-type receiving device 10a, a secure-key generation rate and an error rate will be described. In the following description, a gate frequency of a single-photon detector will be denoted by f, and the average number of photon-pairs per gate will be denoted by $\mu$. Furthermore, in a single-photon detector (which may also be referred to as "signal-side detector" hereinafter) in the receiving device 120 that receives a signal photon, a detection efficiency will be denoted by $\eta_s$, a dark-current detection rate will be denoted by $d_s$, an after-pulse probability will be denoted by $P_{as}$, and a total loss will be denoted by $\alpha_s$. Moreover, in a single-photon detector (which may also be referred to as "idler-side detector" hereinafter) in the receiving device 130 that receives an idler photon, a detection efficiency will be denoted $\eta_i$, by a dark-current detection rate will be denoted by $d_i$, an after-pulse probability will be denoted by $P_{ai}$, and a total loss will be denoted by $\alpha_i$.

A signal detection rate per gate in each single-photon detector is a sum of a photon detection rate ($\alpha_s \eta_s \mu$ and $\alpha_i \eta_i \mu$) per gate, including the after-pulse probability, and the dark-current detection rate. As described above, in the passive-modulation-type receiving device 10a, the four single-photon detectors 41, 42, 43, and 44 receive photons at equal probabilities. Therefore, a signal detection rate $C_s$ of the signal-side detector and a signal detection rate $C_i$ of the idler-side detector are expressed by expressions (4) and (5) below.

$$C_s = 1/4 \mu \alpha_s \eta_s (1+P_{as}) + d_s \quad (4)$$

$$C_i = 1/4 \mu \alpha_i \eta_i (1+P_{ai}) + d_i \quad (5)$$

Furthermore, a concurrent detection rate $R_c$ per gate of the signal-side detector and the idler-side detector with respect to the pair of photons is expressed by expression (6) below due to the fact that the probability at which their reception bases match is 1/2. This concurrent detection rate $R_c$ that takes into account the reception-base matching probability will be referred to as "real concurrent detection rate".

$$R_c = 1/2 \mu \alpha_s \alpha_i \eta_s \eta_i \quad (4)$$

A general quantum key distribution system that uses single-photon detectors with detection rates $\eta_s$ and $\eta_i$ of about several tens of percent only performs a measurement process for determining whether or not a photon is received. Therefore, even when two pulses are detected in a single gate, the pulses are counted as a single pulse. Consequently, expression (6) above does not include a parameter of the after-pulse probability.

Next, an accidental concurrent detection rate $R_{acc}$ occurring accidentally at the signal-side detector and the idler-side detector will be discussed. Assuming that the statistical distribution of the number of photon-pairs generated at the quantum-entangled-photon light source unit 111 and the number of noises in the single-photon detectors is a Poisson distribution, the accidental concurrent detection rate $R_{acc}$ is a product of a signal detection rate $C_s$ of the signal-side detector and a signal detection rate $C_i$ of the idler-side detector. Because the passive-modulation-type receiving device includes four signal-side detectors and four idler-side detectors, there are sixteen combinations of signal-side detectors and idler-side detectors. In each combination, since the reception-base matching probability is 1/2, the accidental concurrent detection rate $R_{acc}$ is expressed by expression (7) below.

$$R_{acc} = 8 c_s c_i \qquad (7)$$

A sift-key generation rate $R_{sift}$ per gate is a sum of the aforementioned real concurrent detection rate $R_c$ and the accidental concurrent detection rate $R_{acc}$. Therefore, the sift-key generation rate $R_{sift}$ per gate is expressed by expression (8) below.

$$R_{sift} = R_c + R_{acc} \qquad (8)$$

Since half of the accidental concurrent detection rate $R_{acc}$ is an error, an error rate e is expressed by expression (9) below.

$$e = \frac{R_{acc}}{2 R_{sift}} \qquad (9)$$

In a general quantum key distribution system, for example, the average number $\mu$ of photon-pairs per gate is about 0.1, the detection efficiencies $\eta_s$ and $\eta_i$, are about 0.1, and the total losses $\alpha_s$ and $\alpha_i$ excluding propagation losses are about 0.1. In this condition, for example, in a quantum key distribution system with a transmission distance of 50 km and a transmission loss of 10 dB, a commercially-available InGaAs/InP avalanche photodiode is used so that the dark-current detection rates $d_s$ and $d_i$ per gate can be minimized to about $1 \times 10^{-5}$. Consequently, since the dark-current detection rates $d_s$ and $d_i$ in the single-photon detectors are sufficiently low ($\alpha_s \eta_s \mu \gg d_s$ and $\alpha_i \eta_i \mu \gg d_i$) as compared with photon detection rates per gate, the dark-current detection rates $d_s$ and $d_i$ can be approximated to zero.

By approximating the dark-current detection rates $d_s$ and $d_i$ to zero, the error rate e can be expressed by expression (10) below based on expressions (4) to (9) above.

$$e \cong \frac{1}{2} \frac{\mu(1+P_{as})(1+P_{ai})}{1+\mu(1+P_{as})(1+P_{ai})} \qquad (10)$$

In this case, assuming that the amount of information (i.e., amount of bits) after a key distillation process is defined as H(e), a generation rate $f_{secure}$ of an ultimately-obtained secure key can be expressed by expressions (11) to (13) below based on expression (3) above.

$$f_{secure} = R_{sift} f H(e) \cong \frac{1}{2} \alpha_s \alpha_i f\left(\frac{\eta_s}{1+P_{as}}\right)\left(\frac{\eta_i}{1+P_{ai}}\right) F(x) \qquad (11)$$

$$F(x) = x(1+x) H\left(\frac{1}{2} \frac{x}{1+x}\right) \qquad (12)$$

$$x \equiv \mu(1+P_{as})(1+P_{ai}) \qquad (13)$$

It is clear from expression (10) above that the error rate e does not increase even when the after-pulse probabilities $P_{as}$ and $P_{ai}$ increase. For example, even in a system that uses single-photon detectors with after-pulse probabilities $P_{as}$ and $P_{ai}$ of 100%, the average number $\mu$ of photon-pairs per gate is reduced to 1/2 so that the error rate e is minimized, similar to a case where single-photon detectors with after-pulse probabilities $P_{as}$ and $P_{ai}$ of 0% are used. Therefore, in the quantum-entanglement-based quantum key distribution system, the secure-key generation rate is not limited by the after-pulse probabilities $P_{as}$ and $P_{ai}$.

Then, based on expression (11) above, a parameter $\eta_s/(1+P_{as})$ in the signal-side detector and a parameter $\eta_i/(1+P_{ai})$ in the idler-side detector are increased so that the secure-key generation rate $f_{secure}$ can be set to a large value. In the following description, the parameter $\eta_s/(1+P_{as})$ in the signal-side detector and the parameter $\eta_i/(1+P_{ai})$ in the idler-side detector may be collectively referred to as "$\eta/(1+P_a)$".

Therefore, in the single-photon detectors 41, 42, 43, and 44 included in the receiving device 10a according to this embodiment, a first performance index for the secure key generation rate $f_{secure}$ is provided by the parameter $\eta/(1+P_a)$. Then, for example, a drive parameter, such as applied bias voltage, is set so as to increase the first performance index $\eta/(1+P_a)$. As a result, a satisfactory secure-key generation rate $f_{secure}$ can be obtained without being restricted by the after-pulse probability $P_a$.

For example, a single-photon detector with an after-pulse probability $P_a$ of 0% when the detection efficiency $\eta$ is 10% or with an after-pulse probability $P_a$ of 100% when the detection efficiency $\eta$ is 30% will be discussed. In the single-photon detector in this condition, the first performance index $\eta/(1+P_a)$ becomes 0.1 when the detection efficiency $\eta$ is 10%, or the first performance index $\eta/(1+P_a)$ becomes 0.15 when the detection efficiency $\eta$ is 30%. Accordingly, even when the after-pulse probability $P_a$ increases in accordance with an increase in the detection efficiency $\eta$, there is a case where the first performance index $\eta/(1+P_a)$ can be increased. Thus, in the single-photon detectors 41, 42, 43, and 44 according to this embodiment, the restriction by the after-pulse probability $P_a$ is alleviated so that a satisfactory secure-key generation rate can be obtained over a wide range of after-pulse probabilities. For example, by maximizing the first performance index $\eta/(1+P_a)$, the secure-key generation rate $f_{secure}$ can be maximized.

In expressions (10) to (13) above, a function F(x) is a simple function of a function H [x/{2(1+x)}] (sometimes expressed as H(x) hereinafter). Therefore, by determining the function H(x), an x value that provides a desired (e.g., maximum) F(x) as well as F(x) corresponding to that x value can be determined. Consequently, by determining H(x) that is determined based on the specifications of a key distillation process, an x value that provides a desired secure-key generation rate $f_{secure}$ can be determined. Then, the average number $\mu$ of photon-pairs per gate can be uniquely determined from this x value.

As already described above, the amount of information H(e) after the key distillation process can be expressed by, for example, expression (2) above. When the key distillation process for obtaining the amount of information H(e) in expression (2) above is to be performed, F(x) becomes a maximum value of 0.05874 when expression (14) below is satisfied based on an error correcting capability f(e) of 1.

$$x = \mu(1+P_{as})(1+P_{ai}) = 0.135545 \qquad (14)$$

As described above, H(x) is determined based on the specifications of the key distillation process. Therefore, even when the key distillation process for obtaining the amount of information H(e) in expression (2) above is to be performed, the average number $\mu$ of photon-pairs per gate is determined so that F(x) is increased (e.g., maximized) in accordance with the specifications of the key distillation process, whereby a satisfactory secure-key generation rate $f_{secure}$ can be obtained.

Accordingly, in the single-photon detectors 41, 42, 43, and 44 included in the receiving device 10a according to this embodiment, a second performance index for the secure-key generation rate $f_{secure}$ is provided by the function F(x) indicated in expressions (12) and (13) above. Whether the after-pulse probability $P_a$ is of any value, the average number μ of photon-pairs per gate can be set such that the second performance index F(x) becomes a desired (e.g., maximum) value.

As described above, in this embodiment, the first performance index $\eta/(1+P_a)$ or the second performance index F(x) provided by expressions (12) and (13) above is appropriately set (e.g., maximized) so that the secure-key generation rate $f_{secure}$ can be increased without being restricted by the after-pulse probability $P_a$.

Active Modulation Type

Figure 3:
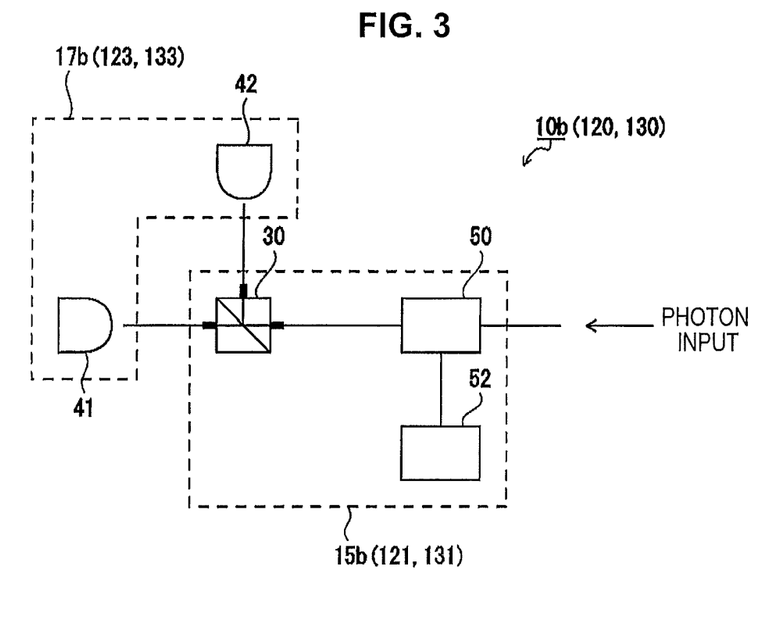
FIG. 3 schematically illustrates an active-modulation-type receiving device.

An active-modulation-type receiving device will be described with reference to FIG. 3. FIG. 3 schematically illustrates an active-modulation-type receiving device. A receiving device 10b shown in FIG. 3 corresponds to the receiving devices 120 and 130 shown in FIG. 1. Furthermore, a base selecting unit 15b shown in FIG. 3 corresponds to the base selecting units 121 and 131 shown in FIG. 1. Moreover, a photon detecting unit 17b shown in FIG. 3 corresponds to the photon detecting units 123 and 133 shown in FIG. 1.

In the active-modulation-type receiving device 10b, the base selecting unit 15b has a polarization beam splitter 30, a polarization converter 50, and a random number generator 52. The photon detecting unit 17b has two single-photon detectors 41 and 42.

In the active-modulation-type receiving device 10b, a reception base is randomly selected by using the polarization converter 50 and the random number generator 52. A preferred example of polarization converter 50 is an optical-axis-variable half-wave plate. In accordance with a random number generated by the random number generator 52, the polarization converter 50 performs conversion between a state where two optical axes are aligned with a vertical polarization direction and a horizontal polarization direction and a state where the two optical axes are rotated by 22.5 degrees.

The polarization beam splitter 30 is disposed at a subsequent stage of the polarization converter 50, and the first single-photon detector 41 and the second single-photon detector 42 are respectively disposed at two output terminals of the polarization beam splitter 30.

In the active-modulation-type receiving device 10b, the state where the optical axes of the polarization converter 50 are aligned with the vertical polarization direction and the horizontal polarization direction corresponds to that the H/V reception base is selected, and the state where the optical axes are rotated by 22.5 degrees corresponds to that the diagonal reception base is selected.

With regard to this active-modulation-type receiving device 10b, a secure-key generation rate and an error rate will be described.

In the active-modulation-type receiving device 10b, the two single-photon detectors 41 and 42 receive photons at equal probabilities. Therefore, a signal detection rate $C_s$ of the signal-side detector and a signal detection rate $C_i$ of the idler-side detector are expressed by expressions (15) and (16) below.

$$C_s = 1/2 \mu \alpha_s \eta_s (1+P_{as}) + d_s \quad (15)$$

$$C_i = 1/2 \mu \alpha_i \eta_i (1+P_{ai}) + d_i \quad (16)$$

Since the reception-base matching probability is 1/2, the real concurrent detection rate $R_c$ is expressed by expression (6) above, as in the passive-modulation-type receiving device 10a.

As described above, the accidental concurrent detection rate $R_{acc}$ is a product of the signal detection rate $C_s$ of the signal-side detector and the signal detection rate $C_i$ of the idler-side detector. Because the active-modulation-type receiving device 10b includes two signal-side detectors and two idler-side detectors, there are four combinations of signal-side detectors and idler-side detectors. In each combination, since the reception-base matching probability is 1/2, the accidental concurrent detection rate $R_{acc}$ is expressed by expression (17) below.

$$R_{acc} = 2 c_s c_i \quad (17)$$

The sift-key generation rate $R_{sift}$ per gate is expressed by expression (8) above, as in the passive-modulation-type receiving device 10a. Since half of the accidental concurrent detection rate $R_{acc}$ is an error, the error rate e is expressed by expression (9) above. With the dark-current detection rates $d_s$ and $d_i$ in the single-photon detectors being sufficiently low ($\alpha_s \eta_s \mu \gg d_s$ and $\alpha_i \eta_i \mu \gg d_i$) as compared with photon detection rates per gate, the dark-current detection rates $d_s$ and $d_i$ are approximated to zero so that the error rate e can be expressed by expression (10) above, as in the passive-modulation-type receiving device 10a, based on expressions (6), (8), (9), and (15) to (17) above. Furthermore, assuming that the amount of information (i.e., amount of bits) after a key distillation process is defined as H(e), a generation rate $f_{secure}$ of an ultimately-obtained secure key can be expressed by expressions (11) to (13) above based on expression (3) above.

Therefore, similar to the passive-modulation-type receiving device 10a, the first performance index for the secure-key generation rate $f_{secure}$ in the single-photon detectors 41 and 42 is provided by the parameter $\eta/(1+P_a)$ in the active-modulation-type receiving device 10b. Then, for example, a drive parameter, such as applied bias voltage, is set so as to increase the first performance index $\eta/(1+P_a)$. As a result, a satisfactory secure-key generation rate $f_{secure}$ can be obtained without being restricted by the after-pulse probability $P_a$.

In the single-photon detectors 41 and 42, the second performance index for the secure-key generation rate $f_{secure}$ provided by the function F(x) indicated in expressions (12) and (13) above. Whether the after-pulse probability $P_a$ is of any value, the average number μ of photon-pairs per gate can be set such that the second performance index F(x) becomes a desired (e.g., maximum) value.

As described above, in the active-modulation-type receiving device 10b, the first performance index $\eta/(1+P_a)$ or the second performance index F(x) provided by expressions (12) and (13) above is appropriately set (e.g., maximized) so that the secure-key generation rate $f_{secure}$ can be obtained without being restricted by the after-pulse probability $P_a$.

Time-Bin-Entanglement-Based Quantum Key Distribution System

The above description relates to a so-called polarization-entanglement-based quantum key distribution system that utilizes a pair of polarization-entangled photons. However, the receiving device according to this embodiment is not limited to the use in a polarization-entanglement-based quantum key distribution system and may be used in quantum key distribution systems of other types. The following description relates to a case where the receiving device according to this embodiment is used in a so-called time-bin-entanglement-based quantum key distribution system that utilizes a pair of time-bin entangled photons.

A pair of time-bin entangled photons has multiple time slots in which photons may exist. It is not determined which one of the time slots each photon exists in, but the time-bin relationship between each pair of photons is determined. Therefore, pairs of time-bin entangled photons are in a state where the ways in which the photons existing in the pairs of photons are distributed to the time slots are superposed, and are pairs of correlated photons having a time-bin correlation between the pairs of photons.

In a time-bin entanglement type that typically utilizes two pulses, the concurrent detection rate $R_c$ per gate is determined in accordance with a reception-base matching probability between the signal-side detector and the idler-side detector and a matching probability at which either one of the two slots receives the pair of photons. Therefore, as discussed in Non-Patent Literature 2 described above, the coefficient of the concurrent detection rate $R_c$ differs from that in the above-described quantum-entanglement type. In the time-bin entanglement type that uses two pulses, the concurrent detection rate $R_c$ is expressed by expression (18) below.

$$R_c = 1/4 \mu \alpha_s \alpha_i \eta_s \eta_i \quad (18)$$

As a result, with the dark-current detection rates $d_s$ and $d_i$ in the single-photon detectors being sufficiently low ($\alpha_s \eta_s \mu \gg d_s$ and $\alpha_i \eta_i \eta \gg d_i$) as compared with photon detection rates per gate, the dark-current detection rates $d_s$ and $d_i$ are approximated to zero so that the error rate e in the time-bin entanglement type is expressed by expression (19) below and the secure-key generation rate $f_{secure}$ is expressed by expression (20) below.

$$e \cong \frac{1}{2} \frac{2\mu(1+P_{as})(1+P_{ai})}{1+2\mu(1+P_{as})(1+P_{ai})} \quad (19)$$

$$f_{secure} \cong \frac{1}{8} \alpha_s \alpha_i f \left(\frac{\eta_s}{1+P_{as}}\right)\left(\frac{\eta_i}{1+P_i}\right) F(2x) \quad (20)$$

It is clear from expressions (19) and (20) above that the error rate e and the secure-key generation rate $f_{secure}$ in the time-bin entanglement type are equivalent to substituting 2x for x in expressions (10) and (11) above in the polarization-entanglement type and reducing the secure-key generation rate $f_{secure}$ by 1/4.

Therefore, the first performance index for the secure-key generation rate $f_{secure}$ in the first single-photon detectors 41 and 42 is provided by the parameter $\eta/(1+P_a)$, as in the polarization-entanglement type. Then, for example, a drive parameter, such as applied bias voltage, is set so as to increase the first performance index $\eta/(1+P_a)$. As a result, a satisfactory secure-key generation rate $f_{secure}$ can be obtained without being restricted by the after-pulse probability $P_a$.

Furthermore, the second performance index for the secure-key generation rate $f_{secure}$ is provided by a function F(2x) shown in expression (20) above. Whether the after-pulse probability $P_a$ is of any value, the average number μ of photon-pairs per gate can be set such that the second performance index F(2x) becomes a desired (e.g., maximum) value. For example, when a key distillation process for obtaining the amount of information H(e) in expression (2) above is to be performed, F(2x) becomes a maximum value of 0.05874 when expression (21) below is satisfied based on an error correcting capability f(e) of 1.

$$x = 2\mu(1+P_{as})(1+P_{ai}) = 0.135545 \quad (21)$$

As described above, in the time-bin-entanglement-based quantum key distribution system, the first performance index $\eta/(1+P_a)$ or the second performance index F(2x) is appropriately set (e.g., maximized) so that a secure-key generation rate $f_{secure}$ can be increased without being restricted by the after-pulse probability $P_a$.

Test

The present inventor has performed a test for evaluating the single-photon detectors included in the passive-modulation-type receiving device 10a and the active-modulation-type receiving device 10b described above. For this test, two single-photon detectors, namely, a first single-photon detector (which may also be referred to as "first detector" hereinafter) and a second single-photon detector (which may also be referred to as "second detector" hereinafter), are prepared. As for each of the first detector and the second detector, a single-photon benchtop receiver PGA-600HSU manufactured by Princeton Lightwave, Inc. is used, which is a single-photon detector that utilizes an InGaAs/In avalanche photodiode. For each of the first detector and the second detector, a gate frequency f is set to 40 MHz, and a gate time in which a reverse bias voltage that exceeds an avalanche critical voltage is applied is set to 1 ns.

Figure 4A:
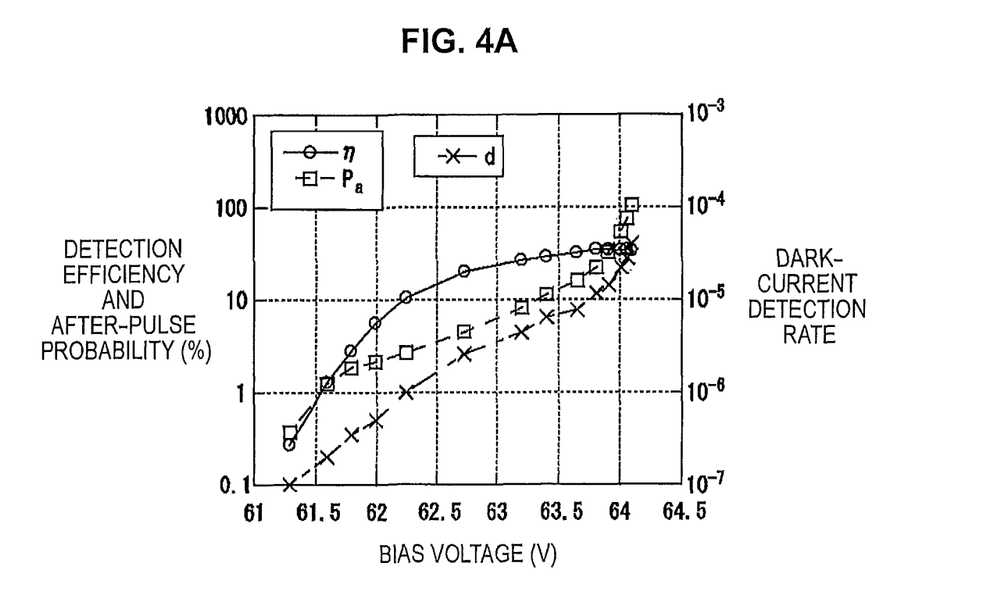
FIGS. 4A and 4B illustrate changes in detection efficiency, after-pulse probability, and dark-current detection rate relative to a change in bias voltage in single-photon detectors used in a test.
Figure 4B:
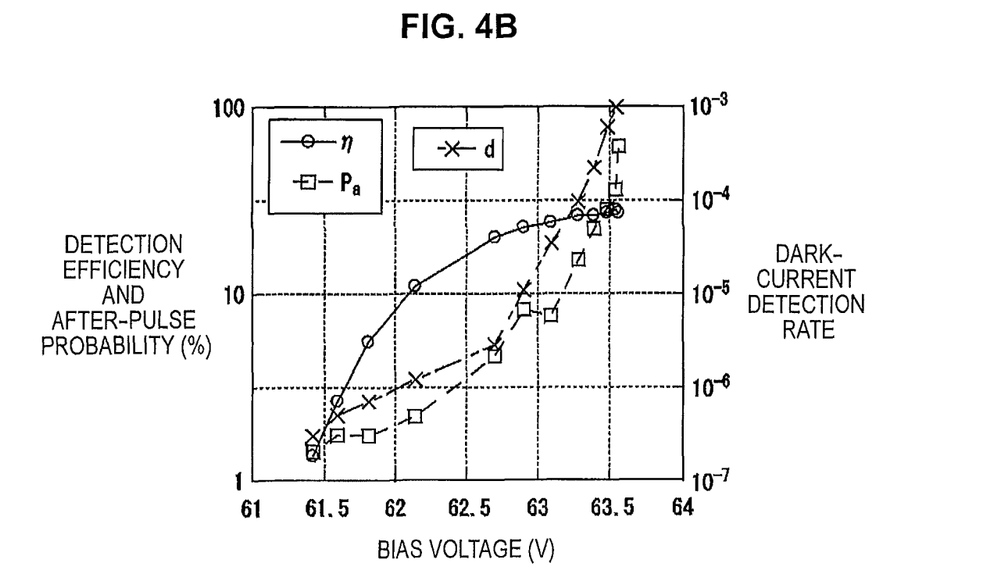

First, changes in the detection efficiency η, the after-pulse probability $P_a$, and the dark-current detection rate d relative to a change in the bias voltage are examined for each of the first detector and the second detector used in the test. The results obtained are shown in FIGS. 4A and 4B. FIG. 4A shows the result of the first detector and FIG. 4B shows the result of the second detector. In each of FIGS. 4A and 4B, the detection efficiency η and the after-pulse probability $P_a$ are shown in units of percentages at the left side of the ordinate axis, the dark-current detection rate d is shown on an arbitrary scale at the right side of the ordinate axis, and the bias voltage is shown in units of voltages along the abscissa axis.

As shown in FIGS. 4A and 4B, in the first detector and the second detector, the after-pulse probability $P_a$ and the dark-current detection rate d increase with increasing bias voltage. It is clear from FIGS. 4A and 4B that the increasing rates of the after-pulse probability $P_a$ and the dark-current detection rate d are greater than the increasing rate of the detection efficiency η.

Figure 5:
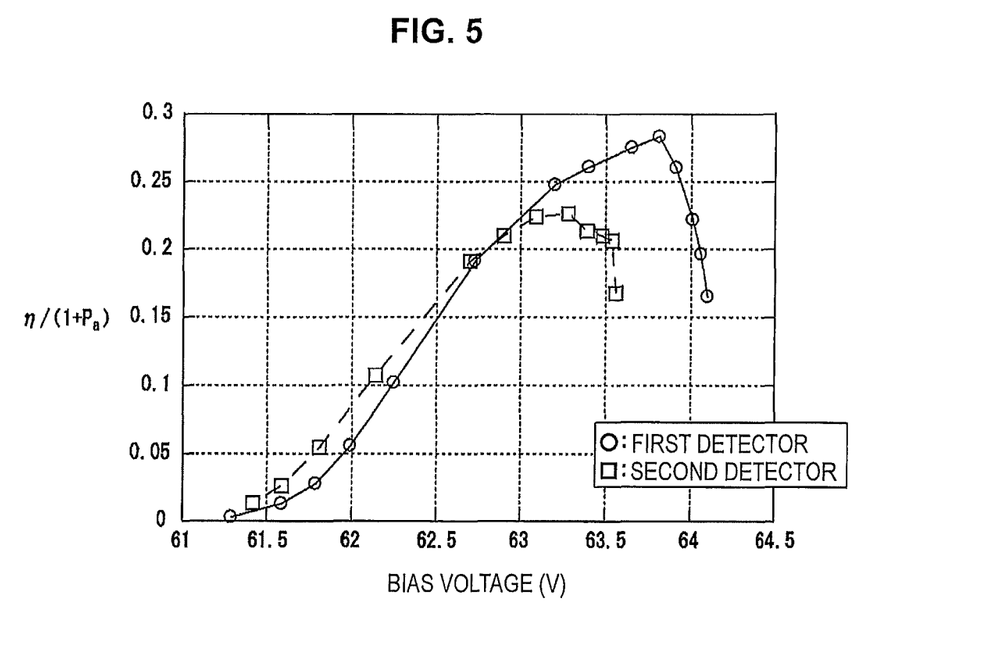
FIG. 5 illustrates a change in first performance index relative to a change in bias voltage.

Subsequently, FIG. 5 illustrating a change in the first performance index $\eta/(1+P_a)$ relative to a change in the bias voltage has been created based on the results in FIGS. 4A and 4B. In FIG. 5, the ordinate axis denotes the first performance index $\eta/(1+P_a)$ on an arbitrary scale, and the abscissa axis denotes the bias voltage in units of voltages.

As described above, the secure-key generation rate $f_{secure}$ f is dependent on the first performance index. By setting the first performance index $\eta/(1+P_a)$ to a large value, the secure-key generation rate $f_{secure}$ can be increased. Therefore, for example, in the conditions of this test, the bias voltage is set based on FIG. 5 such that the first performance index $\eta/(1+P_a)$ is increased, whereby a satisfactory secure-key generation rate $f_{secure}$ can be obtained. As shown in FIG. 5, in the first detector, the first performance index $\eta/(1+P_a)$ is maximized by setting the bias voltage within a range between 63.5 V and 64 V. In the second detector, the first performance index $\eta/(1+P_a)$ is maximized by setting the bias voltage within a range between 63 V and 63.5 V.

Figure 6:
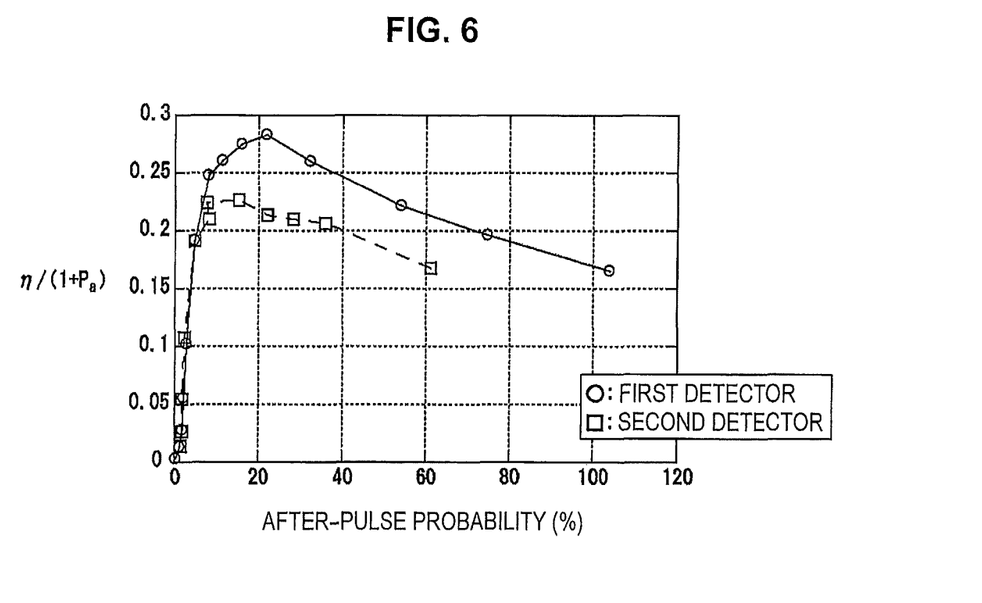
FIG. 6 illustrates a change in first performance index relative to a change in after-pulse probability.

Subsequently, FIG. 6 illustrating a change in the first performance index $\eta/(1+P_a)$ relative to a change in the after-pulse probability $P_a$ has been created based on the results in FIGS. 4A and 4B. In FIG. 6, the ordinate axis denotes the first performance index $\eta/(1+P_a)$ on an arbitrary scale, and the abscissa axis denotes the after-pulse probability $P_a$ in units of percentages.

As shown in FIG. 6, in the first detector and the second detector, the first performance index $\eta/(1+P_a)$ is maximized when the after-pulse probability $P_a$ ranges between 10% and 30%.

Now, a case where the first detector and the second detector are used in a single-photon-type quantum key distribution system will be discussed. Considering that an operationally allowable after-pulse probability $P_a$ is about 4% to 5%, it is clear from FIGS. 4A and 4B that the detection efficiency of each of the first detector and the second detector can only be increased to about 20%. In contrast, in this embodiment that employs the quantum-entanglement method, the first performance index $\eta/(1+P_a)$ of each of the first detector and the second detector is maximized when the after-pulse probability $P_a$ is between 10% and 30%, as shown in FIG. 6, so that the detection efficiency η can be set to 30% or higher. Therefore, the allowable limit for the after-pulse probability $P_a$ is greater than that in the case where the single-photon method is employed, so that the secure-key generation rate $f_{secure}$ can be increased. When the after-pulse probability $P_a$ is between 10% and 30%, the first performance index $\eta/(1+P_a)$ of each of the first detector and the second detector is about 1.3 to 1.5 times that when the after-pulse probability $P_a$ is between 4% and 5%. Therefore, it can be considered that the quantum-entanglement-based quantum key distribution system according to this embodiment achieves an increase in speed of about 2 times (i.e., 1.4 times in the first detector multiplied by 1.4 times in the second detector) the secure-key generation rate $f_{secure}$ obtained with the parameter settings in the single-photon method.

Figure 7:
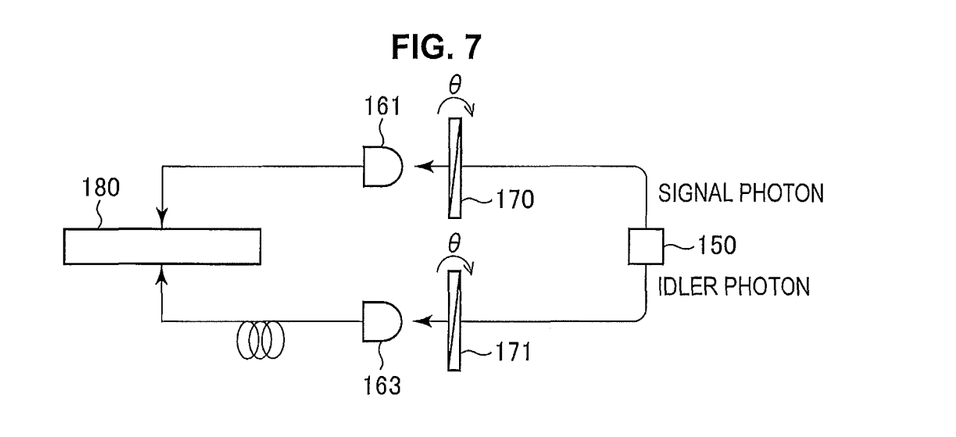
FIG. 7 schematically illustrates a test system used for measuring a two-photon interference waveform.

Subsequently, a two-photon interference waveform has been measured by using the first detector and the second detector. In a test in which this measurement process is performed, a test system similar to that in FIG. 1 in "S. Arahira and H. Murai, "Experimental investigation in transmission performance of polarization-entangled photon-pairs generated by cascaded $\chi^{(2)}$ processes over standard single-mode optical fibers" Optics Express vol. 20, No. 14, pp. 15336-15346 (2012)" is used. FIG. 7 schematically illustrates this test system.

In this test, a polarization-entangled photon in a 1.5-μm waveband is generated by using a quantum-entangled-photon light source unit 150 that utilizes a cascade-light second-harmonic/parametric down-conversion method. Then, a signal photon is received by a first detector 161, which is described above, and an idler photon is received by a second detector 163, which is described above. Furthermore, a transmission-angle-variable polarizer 170 is provided between the quantum-entangled-photon light source unit 150 and the first detector 161, and a transmission-angle-variable polarizer 171 is provided between the quantum-entangled-photon light source unit 150 and the second detector 163. The polarizer angle at the idler-photon side is changed while the polarizer angle at the signal-photon side is fixed. Then, a process for measuring the number of concurrent detections every 15 seconds by the first detector 161 and the second detector 163 is performed by using a time-interval analyzer 180. Fiber transmission between the quantum-entangled-photon light source unit 150 and the first detector 161 and between the quantum-entangled-photon light source unit 150 and the second detector 163 is not performed, and a substantial transmission distance is thus set to 0 m.

Furthermore, in this test, three conditions shown in Table 1 are set for the first detector 161 and the second detector 163.

In condition 2, the first detector 161 has a detection efficiency $\eta$ of about 34.5% and an after-pulse probability $P_a$ of 22%. The second detector 163 has a detection efficiency $\eta$ of about 30.3% and an after-pulse probability $P_a$ of 10%. This condition 2 is a condition for maximizing the first performance index. Therefore, in this condition 2, it is expected that a maximum secure-key generation rate $f_{secure}$ can be achieved in the quantum-entanglement-based quantum key distribution system according to this embodiment.

In condition 3, the after-pulse probability $P_a$ of the first detector 161 is degraded to 100% or higher. Moreover, the first performance index of the second detector 163 is maximized similarly to that in condition 2 described above.

Furthermore, in each condition, the average number μ of photon-pairs per gate is set such that $x=\mu(1+P_{as})(1+P_{ai})=0.11$ is satisfied.

Figure 8A:
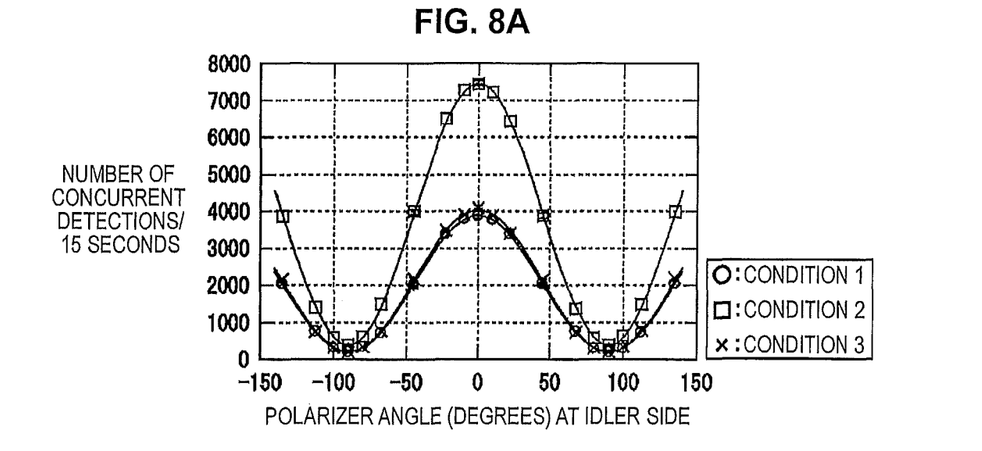
FIGS. 8A and 8B illustrate measurement results of two-photon interference waveforms obtained by employing a single-photon method according to this invention.
Figure 8B:
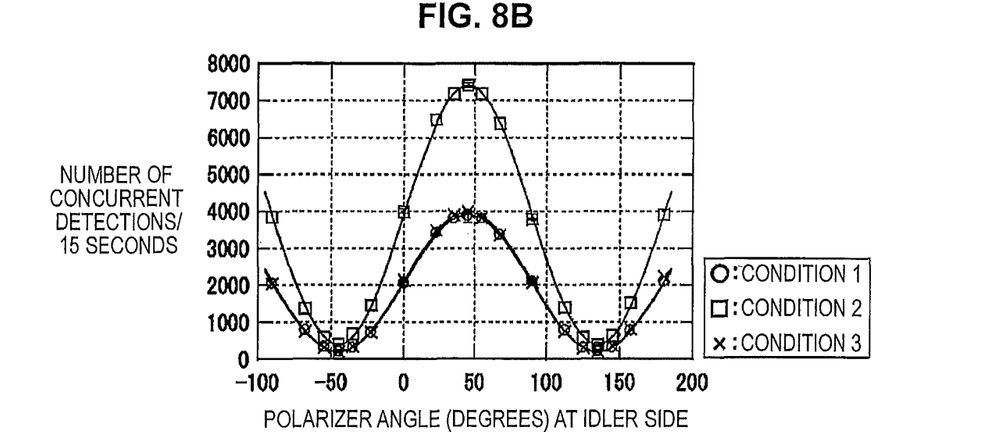

FIGS. 8A and 8B illustrate measurement results of two-photon interference waveforms obtained using the first detector and the second detector under conditions 1 to 3. FIG. 8A illustrates a measurement result obtained in a case where the photon-pair transmission base is an H/V transmission base. FIG. 8B illustrates a measurement result obtained in a case where the photon-pair transmission base is an H/V transmission base. Furthermore, in FIGS. 8A and 8B, the ordinate axis denotes the number of concurrent detections for every 15 seconds on an individual basis and also denotes the polarization angle applied to the idler photon by the polarizer 171 in units of degrees.

The present inventor has calculated an articulation based on the results in FIGS. 8A and 8B. An articulation V is indicated by the relationship between the error rate e and expression (22) below.

$$e = 1/2(1-V) \qquad (22)$$

It is clear from expression (22) above that the error rate e decreases with increasing articulation V. Therefore, when the articulation V increases, the secure-key generation rate $f_{secure}$ increases. Consequently, the articulation V can be used as an indicator for the secure-key generation rate $f_{secure}$.

An articulation V can be determined from expression (23) below by using a maximum value of the concurrent detection rate (i.e., a maximum concurrent detection rate) and a minimum value of the concurrent detection rate (i.e., a minimum concurrent detection rate) in a two-photon interference waveform.

TABLE 1

| | FIRST DETECTOR (signal) | | | SECOND DETECTOR (idler) | | | PERFORMANCE INDEX $\left(\frac{\eta_s}{1+P_{as}}\right)\left(\frac{\eta_i}{1+P_{ai}}\right)$ |
|---|---|---|---|---|---|---|---|
| | $\eta$ (%) | d | $P_a$ (%) | $\eta/(1+P_a)$ | $\eta$ (%) | d | $P_a$ (%) | $\eta/(1+P_a)$ | |
| CONDITION 1 | 20.0 | $2.8 \times 10^{-6}$ | 4.5 | 0.1914 | 20.0 | $2.8 \times 10^{-6}$ | 4.5 | 0.1914 | 0.03663 |
| CONDITION 2 | 34.5 | $1.2 \times 10^{-5}$ | 22 | 0.2828 | 30.3 | $4.7 \times 10^{-5}$ | 10 | 0.2755 | 0.07791 |
| CONDITION 3 | 33.7 | $4.0 \times 10^{-5}$ | 104 | 0.1652 | 30.3 | $4.7 \times 10^{-5}$ | 10 | 0.2755 | 0.04551 |

In condition 1, the first detector 161 and the second detector 163 both have a detection efficiency $\eta$ of about 20% and an after-pulse probability $P_a$ of 4.5%. In this condition 1, it is expected that a maximum secure-key generation rate $f_{secure}$ can be achieved in a case where the first detector 161 and the second detector 163 are used in a single-photon-type quantum key distribution system.

$$V = \frac{C_{max} - C_{min}}{C_{max} + C_{min}} \qquad (23)$$

The articulations V in conditions 1 to 3 calculated based on the results in FIGS. 8A and 8B are shown in Table 2.

TABLE 2

| | H/V | | Diagonal | | PERFORMANCE INDEX $\left(\frac{\eta_s}{1+P_{as}}\right)\left(\frac{\eta_i}{1+P_{ai}}\right)$ |
|---|---|---|---|---|---|
| | V | MAX. NUMBER OF CONCURRENT DETECTIONS | V | MAX. NUMBER OF CONCURRENT DETECTIONS | |
| CONDITION 1 | 90.20 ± 0.71 | 3880 ± 37 (1) | 89.96 ± 0.10 | 3900 ± 77 (1.01) | 0.03663 (1) |
| CONDITION 2 | 90.08 ± 0.57 | 7463 ± 63 (1.92) | 89.83 ± 0.63 | 7401 ± 67 (1.91) | 0.07791 (2.13) |
| CONDITION 3 | 90.10 ± 0.45 | 4034 ± 38 (1.04) | 90.00 ± 0.38 | 3977 ± 34 (1.03) | 0.04551 (1.24) |

(*) NUMBER IN PARENTHESES DENOTES RELATIVE VALUE WITH REFERENCE TO CONDITION 1

According to Table 2, the maximum number of concurrent detections is at a maximum particularly in condition 2 in which the first performance index of each of the first detector 161 and the second detector 163 is maximized. Furthermore, the articulation V is substantially the same value among conditions 1 to 3.

It is confirmed from this result that, in the quantum key distribution system according to this embodiment that uses single-photon detectors, a satisfactory secure-key generation rate is obtained over a wide range of after-pulse probabilities.

It should be understood by those skilled in the art that various modifications, combinations, sub-combinations and alterations may occur depending on design requirements and other factors insofar as they are within the scope of the appended claims or the equivalents thereof.

What is claimed is:

1. A method for controlling a single-photon detector of a quantum-key-distribution receiving device in a quantum key distribution system for high-security information communications, the single-photon detector having an avalanche critical voltage, the method comprising:

applying a plurality of bias voltages to the single-photon detector that each exceed the avalanche critical voltage of the single-photon detector;

measuring an after-pulse probability of the single-photon detector for each of the plurality of bias voltages applied thereto, the after-pulse probability being a probability of finding an after-pulse for a photon detected by the single-photon detector under said each bias voltage;

obtaining a detection efficiency of the single-photon detector for each of the plurality of bias voltages applied thereto;

calculating a performance index $\eta/(1+P_a)$ for each of the plurality of bias voltages applied thereto, $\eta$ and $P_a$ respectively being the detection efficiency and the after-pulse probability of the single-photon detector corresponding to said each bias voltage;

selecting one of the bias voltages that has a largest perform index among the calculated performance indices; and applying the selected bias voltage to the single-photon detector during high-security information communications.

\* \* \* \* \*